Patented Dec. 27, 1949

2,492,630

UNITED STATES PATENT OFFICE 2,492,630

ACYLATION OF THIOPHENE WITH BORON TRIFLUORIDE CATALYST

Howard D. Hartough, Pitman, and Sigmund J. Lukasiewicz, Woodbury, N. J., and Alvin I. Kosak, Columbus, Ohio, assignors to Socony-Vacuum Oil Company, Incorporated, a corporation of New York No Drawing. Application January 12, 1946, Serial No. 641,010

15 Claims. (Cl. 260—329)

This invention relates to a process for the acylation of thiophenes and, more particularly, is directed to a catalytic method for acylating thiophene and its derivatives in the presence of a small amount of boron trifluoride.

Acylation reactions are well known in the art and connote the union between acyl radicals and molecules of organic compounds under conditions of temperature, pressure, and time ordinarily referred to in the art as acylating conditions. The compounds thus produced represent, structurally, the substitution of the original acyl radical on the organic compound molecule, with the elimination of a hydrogen atom.

As a general rule, the temperature, pressure and time of reaction employed in acylation operations depend upon whether the acylation is effected in the absence or presence of acylation catalysts. The two methods are generally referred to as thermal and catalytic acylation, respectively. The majority of acylation processes fall under the latter category and it is a catalytic acylation process with which the present invention is concerned.

Acyl radicals may be furnished in acylation reactions by various materials commonly referred to as acylating agents. Thus, the anhydrides of carboxylic acids, acyl halides, and acyl nitriles have served as sources of the acyl radical. In particular, acetic anhydride and acetyl chloride have found wide application as acylating agents.

The acylation of thiophene and thiophene derivatives has previously been carried out employing one of the above-mentioned acylating agents in the presence of various catalysts, including aluminum chloride, stannic chloride, titanium tetrachloride, phosphorus pentoxide and 2-chloromercurithiophene. Other methods of making acylated thiophenes have included dry distillation of calcium salts of thiophene carboxylic acids and the action of nitriles on thienyl-magnesium iodide.

Of these processes, the catalytic methods employing Friedel-Crafts type catalyst, such as aluminum chloride, stannic chloride, and titanium tetrachloride, have been used most extensively. These catalysts, although applicable with considerable success in the acylation of aromatic hydrocarbons, are only moderately successful where thiophene is involved. This appears to be due to the relative instability of the thiophene ring; the Friedel-Crafts catalyst, for example aluminum chloride, attacking the sulfur atom of the thiophene ring and causing many undesirable secondary reactions with concomitantly low yields of acyl thiophenes. Furthermore, it has been postulated that compounds such as aluminum chloride form addition complexes with the carbonyl group of the resulting ketones substantially decreasing the yield of desired product and requiring a considerable excess of aluminum chloride over the theoretical amount required for the acylation process. Thus, when aluminum chloride is used as the condensing agent, the ratio of catalyst to acyl chloride is at least one and in the case of acid anhydrides at least two. Likewise, other catalysts such as stannic chloride must be used in molecular quantities with respect to the acyl halide being employed in the acylation of thiophene. This is probably due to the fact that acyl halides form comparatively stable molecular complexes with aluminum chloride and stannic chloride, thereby diminishing their catalytic effect.

Moreover, the use of aluminum chloride as a catalyst in the acylation of thiophene entails strict observance of detail in experimental conditions. Thus, it is known that thiophene and aluminum chloride react vigorously in carbon disulfide suspension. It has been reported that a moderately good yield of phenyl-thienyl ketone is obtained by adding a solution of benzoyl chloride and thiophene in carbon disulfide to a suspension of aluminum chloride in the same solvent. If, however, a carbon disulfide solution of the acid chloride was added to a suspension of thiophene and aluminum chloride, much tar was formed and a low yield of ketone resulted. The acylation of thiophene has accordingly been an exceedingly difficult reaction to carry out, the usual acylation catalysts causing excessive resinification of the thiophene reactant. The resinification usually occurs before acylation can be effected and if the expected reaction product is formed, it is generally only in very small amounts. The difficulties inherent in prior art catalytic acylation of thiophene were believed to be due, at least in part, to the relatively large quantities of catalyst being employed; that is, amounts of the order of molecular quantities with respect to reactants being used. Attempts were accordingly made to overcome the existent difficulties by the use of traces or catalytic amounts of aluminum chloride. Minute amounts of this compound, however, failed to catalytically produce any of the desired thienyl ketone.

It has now been discovered that boron trifluoride and complexes thereof which release boron trifluoride under the acylation conditions behave in a distinctive manner as compared with the other Friedel-Crafts catalysts heretofore used in the acylation of thiophenes. It has been found that by using a boron trifluoride catalyst, the above-mentioned difficulties encountered in the acylation of thiophenes have largely been overcome. It would appear that the advantages obtained using a boron trifluoride catalyst can be attributed to the fact that relatively small quantities, that is, less than one mole of boron trifluoride per mole of acylating agent, can be used as effective catalysts in the acylation of thiophene and its derivatives. By employing a boron trifluoride catalyst in catalytic amounts, the undue resinification and formation of addition complexes formerly encountered in the catalytic acylation of thiophenes have been substantially eliminated, the products resulting being almost entirely acyl derivatives having one or more side chains corresponding to that of the acylating agent. It has been found, in accordance with this invention, that boron trifluorides employed in molar quantities not greater than the amount of thiophene or acylating agent used in least amount effect the acylation of said thiophene smoothly and specifically in contrast to the more conventional acylation Friedel-Crafts type catalysts employed heretofore, giving a substantial yield of desired ketone without accompanying formation of complex addition products and resinification. The acylation of thiophenes, moreover, can be carried out in a relatively simple and direct manner without a detailed observance of experimental conditions, such as is a necessary precaution to be taken when aluminum chloride is employed as catalyst.

It is, accordingly, an object of the present invention to provide an efficient process for synthesizing acylated thiophenes. Another object is to provide a process for catalytically acylating thiophene and its derivatives. A still further object is to afford a process for catalytically acylating thiophene in a direct manner which can easily be carried out using a relatively inexpensive catalyst in small amounts. A very important object is to provide a process capable of reacting thiophene or its derivatives with an acylating agent in the presence of an efficient catalyst without undue formation of addition complexes between the catalyst and thiophene or between the catalyst and acylating agent.

These and other objects which will be recognized by those skilled in the art are attained in accordance with the present invention, wherein thiophene or its derivatives are acylated by reaction with organic carboxylic acid anhydrides or acyl halides in the presence of a small amount of boron trifluoride.

Boron trifluoride conveniently forms complexes with various organic compounds such as ethers, thioethers, alcohols, carboxylic acids, ketones, amines, carboxylic acid anhydrides, and carboxylic esters. These complexes are easily formed by saturating the solutions thereof with gaseous boron trifluoride in a closed pressure vessel. For example, glacial acetic acid, when saturated with boron trifluoride, under pressure forms the compound $CH_3COOH \cdot BF_3$ containing 51.9 per cent $BF_3$. Thus, the present invention contemplates, in addition to boron trifluoride itself, the use, as a catalyst, of boron trifluoride in the form of an organic complex which allows the gaseous boron trifluoride to be conveniently weighed and handled. Representative of the $BF_3$ complexes included are those with ethyl ether, methyl alcohol, formaldehyde, acetone, propionic anhydride and ethyl acetate. This group, of course, is not to be considered as limiting, since other similar organic boron trifluoride complexes which will yield $BF_3$ under the conditions hereinafter set forth may likewise be employed as catalysts in promoting the acylation of thiophene. While the present invention is not to be strictly limited to any specific small amount of catalyst, it has been found that boron trifluoride present in amounts less than one mole per mole of acylating agent is an effective catalytic agent in promoting the acylation of thiophene. In general, it has been found preferable to use an amount of boron trifluoride between about 0.001 and about 0.1 mole per mole of acylating agent.

It is generally believed that the chemical behavior of thiophene is very similar to that of benzene. However, there are some very striking differences. This is illustrated by the fact that the acylating catalysts ordinarily used for the acylation of benzene are not suitable for the acylation of thiophene. Moreover, catalysts which readily effect the acylation of thiophene will not always effect the acylation of benzene. This is particularly true in the present invention. The small quantities of boron trifluoride, which permit the acylation of thiophene to proceed smoothly and efficiently, are inactive in the acylation of benzene. As those in the art known, boron trifluoride has previously been employed as a catalyst in the acylation of benzene. In all of these reactions heretofore carried out, however, it has been necessary to use relatively large quantities of catalyst to effect condensation; that is, amounts equal to or greater than one mole of catalyst per mole of acylating agent used. The small quantities of boron trifluoride under the conditions herein employed in the acylation of thiophene fail to catalyze the acylation of benzene. Thus, a small amount of boron trifluoride, which is inactive catalytically in the acylation of benzene, is, in accordance with the present invention, a preferable catalyst for the acylation of thiophene.

The acylating agents to be used herein may be an organic carboxylic acid anhydride or an acyl halide. Included in the former category are compounds such as the ketenes having the basic structure

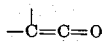

which, upon addition of water, yield organic carboxylic acids. These acylating agents may be derived by methods well known to the art from mono or dibasic organic acids which may be either unsaturated or saturated. Thus, representative acylating agents to be used in this invention include the anhydrides of saturated fatty acids, such as acetic anhydride, propionic anhydride, ketene, etc.; the acyl halides of saturated fatty acids, such as acetyl chloride, stearyl chloride, etc.; the acyl halides of dibasic acids, such as phthalyl chloride; the anhydrides of unsaturated acids, such as crotonic anhydride and the acyl halides of unsaturated acids, such as crotonyl chloride. These acylating agents are given merely by way of examples and are not to be construed as limiting, since other acyl halides or anhydrides of carboxylic acids which will readily suggest themselves to those skilled in the art may likewise be used. It is to be noted that acyl nitriles and carboxylic acids, which have been employed in some acylation reactions, fail to acylate thiophene under the conditions of the present process and, hence, are not to be included herein as acylating agents. In general, carboxylic acid anhydrides are to be preferred as the acylating agents in the present process, since greater yields of the desired ketone were usually obtained when these were used.

Thiophne or derivatives of thiophene having one or more substituent groups, such as halogen, alkyl, aryl, or alkoxy groups attached to the thiophene ring, may be acylated in accordance with this invention. The 2- and 5-positions in the thiophene ring, being adjacent to the sulfur atom, are generally much more reactive than the 3- and 4-positions and, in acylating thiophene, the entering acyl group will preferably attach itself to the carbon atom adjacent to the sulfur. When the 2-position of the thiophene ring is already occupied by a substituent group or atom, the entering acyl group will preferably attach itself to the 5-position. When the 3-position is occupied, the acyl substituent will enter for the most part at the 2-position. However, in some instances a small portion of the 3,5-product may be obtained.

The acylation of thiophene may be carried out employing equimolar quantities of thiophene and acylating agent. However, the presence of an excess of one of the reactants has been found to give an increased yield of the desired product. Thus, an excess of either acylating agent or thiophene gave an increased amount of ketone as compared with those reactions in which equimolar quantities were used.

The temperature at which the reaction is carried out may vary over a wide extent, the upper limit of temperature being dependent on the boiling point of the reactants at the specific pressure of the reaction. In general, temperatures varying between about —30° C. and about 150° C. and pressures varying between atmospheric and about 6 atmospheres have been found satisfactory for effecting the acylation reaction. The effect of increased pressure, theoretically, is toward increased reaction, but from a practical standpoint, this is not a very great effect with reactions such as involved herein which go readily at normal pressures. The preferable temperature range for the process of the present invention, however, appears to be between about 25° C. and about 75° C. Acylation of thiophene carried out in this range under atmospheric pressure resulted in an increased yield of thienyl ketone. Likewise, the formation of resinous, tarry by-products, encountered when the reaction was carried out at the higher temperatures, was substantially eliminated by maintaining the temperature in this preferable range. The reaction period necessary will be dependent largely upon the temperature employed; in general, being less at the higher temperature. Under the conditions set forth above, however, the reaction time will generally vary from about 1 to about 10 hours.

The following detailed examples are for the purpose of illustrating modes of effecting the acylation of thiophene in accordance with the process of this invention. It is to be clearly understood that the invention is not to be considered as limited to the specific acylating agents disclosed hereinafter or to the specific conditions set forth in the examples.

Example 1

To a mixture of one mole of thiophene and one mole of acetic anhydride were added 10 grams of boron trifluoride-ethyl etherate containing 51 per cent boron trifluoride and equivalent to 0.075 mole of boron trifluoride. After the initial heat of reaction had subsided, the temperature was raised to reflux. The temperature of reflux slowly increased from 107 to 115° C. over a period of 3 hours. The reaction was discontinued at this point, cooled, water-washed, washed with sodium carbonate solution and distilled. 45 grams of 2-acetylthiophene, representing a yield of 35 per cent of theory, were obtained.

Example 2

To a mixture of one mole of thiophene and one mole of acetic anhydride were added 4 grams of acetic acid-boron trifluoride complex, equivalent to 0.03 mole of boron trifluoride. The initial heat of reaction raised the temperature of the mixture to 74° C. and after it had subsided, the mixture was heated at a reflux of 125-127° C. for one hour. At the end of this time, the reaction was discontinued and the resulting product cooled, water-washed with sodium carbonate solution and distilled. A yield of 57 grams (45 per cent of theory) of 2-acetylthiophene were obtained along with 30 grams of resinous tars.

Example 3

To a mixture of one mole of thiophene and one mole of acetic anhydride were added 4 grams of methanol-boron trifluoride complex containing 60 per cent boron trifluoride, equivalent to 0.03 mole of boron trifluoride. The initial heat of reaction raised the temperature of the mixture to about 75° C. and after it had subsided, the mixture was heated at a reflux of 125-127° C. for one hour. At the end of this period, the reaction was discontinued and the resultant product was treated as in Example 1, yielding 73 grams of 2-acetylthiophene (58 per cent of theory) and about 30 grams of resinous tars.

Example 4

One mole of thiophene and one mole of acetic anhydride were mixed together and the mixture cooled in an ice bath to 10° C. 4 grams of boron trifluoride-acetic anhydride complex were then added. The temperature rose to about 25° C. and when it finally subsided to 5° C., the ice bath was removed and the reaction mixture warmed to 50° C. and held there for 2 hours. The product was then worked up as in Example 1, yielding 70 grams (56 per cent of theory) of 2-acetylthiophene and less than 2 grams of resinous tars.

Example 5

One mole of thiophene and one mole of acetic anhydride were mixed together and cooled in an ice bath to 10° C. 4 grams of methanol-boron trifluoride complex were then added. The temperature rose to about 25° C. and when it finally subsided to 5° C., the ice bath was removed and the reaction mixture warmed to 50° C. and held there 2 hours. The product was then worked up as in Example 1, yielding 72 grams (57 per cent of theory) of 2-acetylthiophene and less than 2 grams of resinous tarry material.

Example 6

To a mixture of one mole of thiophene and one mole of acetyl chloride were added 4 grams of boron trifluoride-ethyl etherate complex containing 51 per cent boron trifluoride. There was no heat of reaction as noted in the previous examples and the mixture was heated at 48-50° C. for 6 hours. At the end of this period, the reaction mixture was cooled and poured into a cold solution of sodium hydroxide. After water-washing thoroughly, the water layer was extracted with chloroform and distilled. 12 grams (9 per cent of theory) of 2-acetylthiophene were obtained, along with 6 grams of resinous tarry material.

*Example 7*

To 1.5 moles of thiophene were added one mole of benzoyl chloride and 4 grams of boron trifluoride-acetic acid complex. No heat of reaction was noted. The mixture was then heated to a reflux of 90–95° C. for 6 hours and then worked up as described in Example 6 above. There were obtained 63 grams of crude product which was resolved by vacuum distillation into 42 grams (22 per cent yield) of 2-benzoylthiophene and 21 grams of tar.

From the above examples, it will be seen that small amounts of boron trifluoride are effective catalysts for the acylation of thiophene. Likewise, thiophene derivatives having one or more substituent groups attached to the thiophene ring may be acylated in accordance with this invention. The acylated thiophenes produced have found a variety of uses and may be employed as solvents, dye intermediates, addition agents for petroleum fractions, plasticizers, odorants, perfume diluents, resin intermediates, and intermediates for chemical synthesis. Long chain alkyl thienyl ketones may be utilized as synthetic lubricants, waxes, extreme pressure additives for mineral oils and anti-foaming agents.

We claim:

1. A process for preparing an acylthiophene, comprising reacting thiophene with an acylating agent selected from the group consisting of acyl halides and anhydrides of carboxylic acids in the presence of less than 1 mole per mole of acylating agent of a boron trifluoride catalyst.

2. A process for preparing acetylthiophene, comprising reacting thiophene with acetic anhydride in the presence of less than 1 mole of a boron trifluoride catalyst per mole of acetic anhydride.

3. A process for preparing benzoylthiophene, comprising reacting thiophene with benzoyl chloride in the presence of less than 1 mole of a boron trifluoride catalyst per mole of benzoyl chloride.

4. A process for nuclear acylation of an acylatable thiophene compound to yield a product having an acyl radical attached to the thiophene nucleus of said compound, which comprises reacting an acylatable thiophene compound with an acylating agent selected from the group consisting of acyl halides and anhydrides of carboxylic acids in the presence of a small amount of boron trifluoride less than one mole per mole of acylating agent.

5. A process for nuclear acylation of an acylatable thiophene compound to yield a product having an acyl radical attached to the thiophene nucleus of said compound, which comprises reacting an acylatable thiophene compound with an acylating agent selected from the group consisting of acyl halides and anhydrides of carboxylic acids in the presence of a small amount of boron trifluoride-etherate complex equivalent to less than one mole of boron trifluoride per mole of acylating agent.

6. A process for nuclear acylation of an acylatable thiophene compound to yield a product having an acyl radical attached to the thiophene nucleus of said compound, which comprises reacting an acylatable thiophene compound with an acylating agent selected from the group consisting of acyl halides and anhydrides of carboxylic acids in the presence of a small amount of boron trifluoride-fatty acid complex equivalent to less than one mole of boron trifluoride per mole of acylating agent.

7. A process for nuclear acylation of an acylatable thiophene compound to yield a product having an acyl radical attached to the thiophene nucleus of said compound, which comprises reacting an acylatable thiophene compound with an acylating agent selected from the group consisting of acyl halides and anhydrides of carboxylic acids in the presence of a small amount of boron trifluoride-ethyl etherate complex equivalent to less than one mole of boron trifluoride per mole of acylating agent.

8. A process for nuclear acylation of an acylatable thiophene compound to yield a product having an acyl radical attached to the thiophene nucleus of said compound, which comprises reacting an acylatable thiophene compound with an acylating agent selected from the group consisting of acyl halides and anhydrides of carboxylic acids in the presence of a small amount of boron trifluoride-acetic acid complex equivalent to less than one mole of boron trifluoride per mole of acylating agent.

9. A process for nuclear acylation of an acylatable thiophene compound to yield a product having an acyl radical attached to the thiophene nucleus of said compound, which comprises reacting an acylatable thiophene compound with an acylating agent selected from the group consisting of acyl halides and anhydrides of carboxylic acids in the presence of between about 0.001 and about 0.1 mole of boron trifluoride per mole of acylating agent.

10. A process for acylating thiophene, comprising reacting the same with an acylating agent selected from the group consisting of acyl halides and anhydrides of carboxylic acids in the presence of between about 0.001 and about 0.1 mole of boron trifluoride per mole of acylating agent.

11. A process for acylating thiophene, comprising reacting the same with an acylating agent selected from the group consisting of acyl halides and anhydrides of carboxylic acids in the presence of an amount of boron trifluoride-etherate complex equivalent to between about 0.001 and about 0.1 mole of boron trifluoride per mole of acylating agent.

12. A process for nuclear acylation of an acylatable thiophene compound with an acylating agent selected from the group consisting of acyl halides and anhydrides of carboxylic acids in the presence of between about 0.001 and about 0.1 mole of boron trifluoride per mole of acylating agent to yield a product having an acyl radical attached to the thiophene nucleus of said compound, which comprises the steps of mixing an acylatable thiophene, acylating agent and boron trifluoride, reacting the mixture at a temperature between about −30° C. and about 150° C. until the reaction is substantially complete and thereafter removing an acylated thiophene from the reaction product mixture.

13. A process for nuclear acylation of an acylatable thiophene compound with an acylating agent selected from the group consisting of acyl halides and anhydrides of carboxylic acids in the presence of between about 0.001 and about 0.1 mole of boron trifluoride per mole of acylating agent to yield a product having an acyl radical attached to the thiophene nucleus of said compound, which comprises the steps of mixing an acylatable thiophene, acylating agent and boron trifluoride, reacting the mixture at a temperature between about 25° C. and about 75° C. until the reaction is substantially complete and thereafter removing an acylated thiophene from the reaction product mixture.

14. A process for acylating thiophene with an acylating agent selected from the group consisting of acyl halides and anhydrides of carboxylic acids in the presence of between about 0.001 and about 0.1 mole of boron trifluoride per mole of acylating agent, which comprises the steps of mixing thiophene, acylating agent and boron trifluoride, reacting the mixture at a temperature between about −30° C. and about 150° C. until the reaction is substantially complete and thereafter removing acylated thiophene from the reaction product mixture.

15. A process for acylating thiophene with an acylating agent selected from the group consisting of acyl halides and anhydrides of carboxylic acids in the presence of between about 0.001 and about 0.1 mole of boron trifluoride per mole of acylating agent, which comprises the steps of mixing thiophene, acylating agent and boron trifluoride, reacting the mixture at a temperature between about 25° C. and about 75° C. until the reaction is substantially complete and thereafter removing acylated thiophene from the reaction product mixture.

HOWARD D. HARTOUGH.
SIGMUND J. LUKASIEWICZ.
ALVIN I. KOSAK.

REFERENCES CITED

The following references are of record in the file of this patent:

UNITED STATES PATENTS

| Number | Name | Date |
|---|---|---|
| 2,101,560 | Ralston | Dec. 7, 1937 |
| 2,346,926 | Lieber | Apr. 18, 1944 |

OTHER REFERENCES

Calloway: Chem. Rev. 17, 376–7 (1935).
Kastner: Angewandte Chemie, 54, 273 (1941).
Caesar and Sachanen: Ind. Eng. Chem. 40, 922 (1948).